(12) United States Patent
Wang et al.

(10) Patent No.: US 12,032,752 B2
(45) Date of Patent: Jul. 9, 2024

(54) METHOD AND APPARATUS FOR CONTROLLING INPUT FUNCTION, AND STORAGE MEDIUM

(71) Applicant: BEIJING XIAOMI MOBILE SOFTWARE CO., LTD., Beijing (CN)

(72) Inventors: Yin Wang, Beijing (CN); Chao Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/686,138

(22) Filed: Mar. 3, 2022

(65) Prior Publication Data
US 2023/0051203 A1 Feb. 16, 2023

(30) Foreign Application Priority Data
Aug. 10, 2021 (CN) .......................... 202110912614.7

(51) Int. Cl.
*G06F 3/023* (2006.01)

(52) U.S. Cl.
CPC .................................. *G06F 3/023* (2013.01)

(58) Field of Classification Search
CPC ........................................................ G06F 3/023
See application file for complete search history.

(56) References Cited

U.S. PATENT DOCUMENTS

| | | | | |
|---|---|---|---|---|
| 2002/0118168 | A1* | 8/2002 | Hinckley | G06F 3/04855 345/163 |
| 2010/0185797 | A1* | 7/2010 | Tsai | G06F 3/023 710/316 |
| 2012/0040616 | A1* | 2/2012 | Brillhart | H04B 1/40 455/41.3 |
| 2016/0241905 | A1* | 8/2016 | Gao | H04N 21/4316 |
| 2017/0353549 | A1* | 12/2017 | Passeri | G06F 1/1698 |
| 2019/0250759 | A1* | 8/2019 | Chung | G06F 3/0488 |
| 2020/0150782 | A1* | 5/2020 | Gupta | G06F 3/012 |

FOREIGN PATENT DOCUMENTS

CN 111092795 A 5/2020

OTHER PUBLICATIONS

Shuai Qi Xiao Chong, "Logitech K480 Multi-Device Bluetooth Keyboard Get Started: Compatible with Multiple Systems, Seamlessly Switch Three Devices", https://baijiahao.baidu.com/s?id=1617113076312613228&wfr=spider&for=pc, dated Nov. 14, 2018, (8p).
"With It, It is No Longer Troublesome to Code Words in the Circle of Friends—Typeeto", Author: 5Key, https://zhuanlan.zhihu.com/p/20052118, Jan. 7, 2019, (12p).
Extended European Search Report issued in Application No. 22158940.1, dated Aug. 16, 2022,(10p).
Chinese Patent Office, Office Action issue in Application No.: 202110912614.7 dated on Apr. 03, 2024.(17P).

* cited by examiner

*Primary Examiner* — Amit Chatly
(74) *Attorney, Agent, or Firm* — Arch & Lake LLP (57) ABSTRACT

A method for controlling an input function, an apparatus for controlling an input function and a storage medium thereof are provided. The an input function control method is applied to a first device connected to a input device and includes: in response to detecting that an input device sharing function is enabled and an input event sent by the input device is monitored, intercepting the input event; and forwarding the intercepted input event to a second device connected with the first device.

16 Claims, 3 Drawing Sheets

METHOD AND APPARATUS FOR CONTROLLING INPUT FUNCTION, AND STORAGE MEDIUM

CROSS-REFERENCE TO RELATED APPLICATIONS

This application is based upon and claims the priority of the Chinese Patent Application No. 202110912614.7, filed with China National Intellectual Property Administration on Aug. 10, 2021, the content of which is herein incorporated by reference in its entirety for all purposes.

TECHNICAL FIELD

The present disclosure relates to the field of communication transmission, and in particular to a method for controlling an input function, an apparatus for controlling an input function and a storage medium thereof.

BACKGROUND

When a terminal is a smartphone or a tablet, etc., a speed of inputting text on the terminal is slow due to the limitation of the terminal interface. In order to solve this problem, in the related art, the terminal is connected to a keyboard through Bluetooth, and the terminal intercepts a key value input by the keyboard and displays it on the terminal, which can greatly improve the efficiency of inputting text on the terminal.

In actual life, the user's terminal and the keyboard are connected through Bluetooth Low Energy (BLE) or a connection wire. In the case where multiple terminal devices share a set of input devices, after any one of the terminal devices establishes a connection with the input device, such as a keyboard and so on, the input device can only be controlled by the terminal device currently connected to the input device, and the input device cannot be shared with other terminal devices other than the current connected terminal device. Furthermore, when the user wants to switch the input device from one terminal device to another terminal device, the user needs to manually switch the connection wire used to connect the input device and the terminal device, or manually disconnect the connection between the BLE with one terminal device and switch the connection with another terminal device, resulting in poor user experience.

SUMMARY

According to a first aspect of the present disclosure, an input function control method is provided, which is applied to a first device connected to a input device, and the input function control method includes: in response to detecting that an input device sharing function is enabled and an input event sent by the input device is monitored, intercepting the input event; and forwarding the intercepted input event to a second device connected with the first device.

According to a second aspect of the disclosure, there is provided a device for controlling an input function. The device for controlling an input function includes: a processor; memory for storing instructions executable by the processor; wherein, the processor is configured to: in response to detecting that an input device sharing function is enabled and an input event sent by the input device is monitored, intercept the input event; and forward the intercepted input event to a second device connected with the first device.

According to a third aspect of the disclosure, there is provided a non-transitory computer-readable storage medium, when instructions in the storage medium are executed by a processor of a mobile terminal, the mobile terminal is enabled to implement a method for controlling an input function, the method for controlling the input function is applied to a first device connected to a input device and includes: in response to detecting that an input device sharing function is enabled and an input event sent by the input device is monitored, intercepting the input event; and forwarding the intercepted input event to a second device connected with the first device.

It is to be understood that the foregoing general description and the following detailed description are exemplary and explanatory only and are not restrictive of the present disclosure.

BRIEF DESCRIPTION OF THE DRAWINGS

The drawings herein are incorporated into the specification and constitute a part of the specification, show examples consistent with the disclosure, and are used together with the specification to explain the principle of the disclosure.

DETAILED DESCRIPTION

Here, embodiments will be described in detail, and examples thereof are shown in the accompanying drawings. When the following description refers to the drawings, unless otherwise indicated, the same numbers in different drawings indicate the same or similar elements. The implementation manners described in the following embodiments do not represent all implementation manners consistent with the present disclosure. On the contrary, they are merely examples of apparatuses and methods consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In the related art, there is a Bluetooth keyboard including a plurality of Bluetooth modules, each Bluetooth module is connected to one device, and the Bluetooth keyboard supports connection with a plurality of different devices, and the user switches to a device to be operated through a shortcut key. That is, the keyboard is mapped to the device to be operated through Bluetooth, and a key value of the keyboard is shared with the device to be operated, so as to improve the input efficiency. However, the Bluetooth keyboard only supports devices with Bluetooth function, and is not suitable for devices that do not support Bluetooth function. In real life, a user has multiple terminal devices, but the number of input devices such as keyboards and mice does not match the number of terminal devices, so there may be situations where multiple terminal devices share one set of input devices. After the user connects any one of the terminal devices with the input device, the input device can only serve the terminal device connected currently, and it is impossible to share the input device among multiple terminal devices. Here, the sharing means that after any one of the terminal devices is connected to the input device, other terminal devices can also have or enjoy services provided by the input device. In addition, when the user needs to operate other terminal devices through the input device, he or she needs to manually switch the connection wire used to connect the input device and the terminal device, or manually disconnect the connection between BLE and one terminal device and switch to another terminal device, resulting in poor user experience.

In view of this, examples of the present disclosure provide a method for controlling an input function. The method for controlling the input function is applied to a device that is currently connected to an input device. In order to distinguish among devices, the device that is currently connected to the input device is referred to as a first device. The first device is provided with an input device sharing function control. In response to detecting that the input device sharing function is enabled or turned on or a control instruction for enabling or turning on the input device sharing function is received, and monitoring that the input device sends an input event, the input event is intercepted. The intercepted input event is forwarded to other devices connected with the first device. For convenience of description, one or more other devices connected to the first device are referred to as second devices. When the user wants to switch the input device from the first device to the second device, the first device forwards the intercepted input event to the second device connected with the first device, so as to realize displaying the input event sent by the input device on the second device, and the user does not need to manually operate the connection wire between the input device and the first device as well as the second device, which improves the user experience. In this example, the second device may be the same device, or may be multiple different devices.

Figure 1:
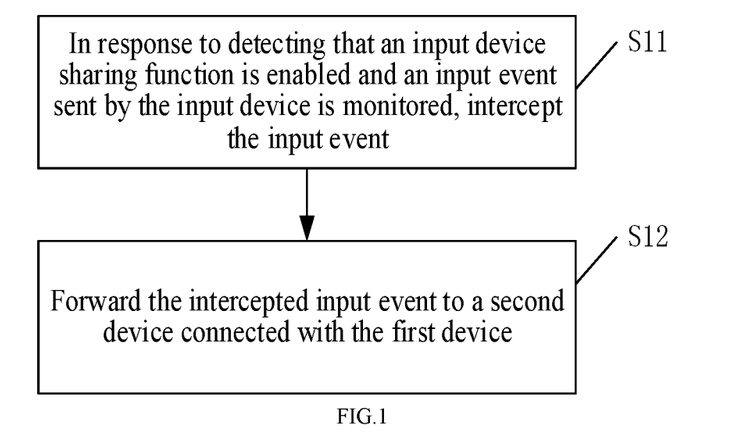
FIG. 1 is a flowchart of a method for controlling an input function according to some examples of the present disclosure.

FIG. 1 is a flowchart of a method for controlling an input function according to some examples. As shown in FIG. 1, the method for controlling the input function is used in a first device, and the first device is connected with an input device. The method for controlling the input function includes the following steps.

In a step S11, in response to detecting that an input device sharing function is enabled and an input event sent by the input device is monitored, the input event is intercepted.

A state of the input device sharing function is detected in the first device, and if it is detected that the input device sharing function is enabled or turned on, then continues to monitor whether the input device sends an input event. In response to detecting that the input device sends the input event, then the input event is intercepted, and the intercepted input event is forwarded to the second device. The state of the input device sharing function is determined by an input device sharing function control set in the first device and/or the received control instruction.

The examples of the present disclosure aim at the defect that multiple devices share a set of input devices, and after one of the multiple devices is connected to the input device, other devices cannot enjoy the services provided by the input device. Based on this, the first device is provided with an input device sharing function control, and the state of the input device sharing function control is detected. If it is detected that the input device sharing function control is triggered, or an instruction instructing to enable or turn on the input device sharing function is received, all the input devices connected to the first device are displayed on a display interface of the first device for the user to select an input device to be shared, i.e., a shared input device. And then the input device to be shared selected by the user is monitored, when the input device to be shared sends an input event, the first device intercepts the input event, and forwards the intercepted input event to the second device at the same time, wherein the second device is a device that is pre-specified by the user and establishes a connection with the first device.

Furthermore, the device involved in the examples of the present disclosure may also be referred to as terminal equipment, a terminal, a mobile station (MS), a mobile terminal (MT), etc., and is a device for providing with the user voice and/or data connectivity. For example, the user equipment (UE) may be a handheld device, a vehicle-mounted device, or the like, having wireless connecting function. Currently, some examples of UEs are: smart phones or mobile phones, Pocket Personal Computers (PPCs), handheld computers, Personal Digital Assistants (PDAs), notebook computers, tablet computers, wearable devices, or vehicle-mounted devices, etc. It should be understood that the examples of the present disclosure do not limit the specific technology and specific device form adopted by the device.

For example, the first device in some examples may be a smartphone, a notebook, a tablet, a TV, etc.; the second device may be a smartphone, a notebook, a tablet, a TV, etc.; and the input device may be a human-machine interface Device (HID), such as a mouse, a keyboard, a touch screen, etc. The first device and the input device may establish a connection through Bluetooth, or establish a connection through a connection wire. The first device and the second device may establish a connection through Bluetooth, or establish a connection through Near Field Communication (NFC). This example does not limit the connection ways between the first device and the input device, as well as the connection ways between the first device and the second device.

In a step S12, the intercepted input event is forwarded to the second device connected with the first device.

The technical solutions provided by the examples of the present disclosure may include the following beneficial effects: if it is detected that the input device sharing function is enabled, and the input event sent by the input device is monitored, the input event is intercepted and the intercepted input event is forwarded to the second device connected with the first device. In this way, the input event sent by the input device connected to the first device is shared with the second device connected with the first device.

Figure 2:
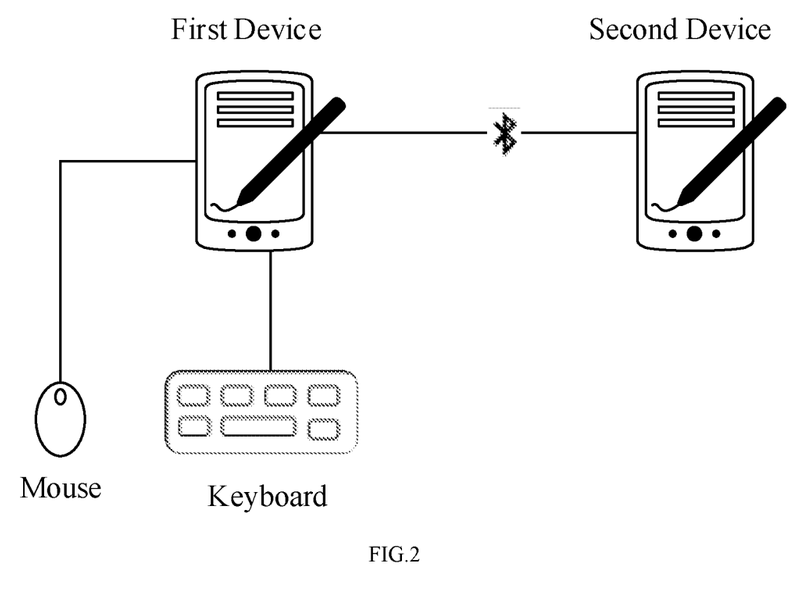
FIG. 2 is a schematic diagram illustrating an application scenario of a method for controlling an input function according to some examples of the present disclosure.

FIG. 2 is a schematic diagram illustrating an application scenario of a method for controlling an input function according to some examples. As shown in FIG. 2, the input devices, such as a mouse and a keyboard, are connected to the first device through connection wires, and the first device and the second device are connected through Bluetooth. Whether to perform an input device sharing can be selected through the input device sharing function control provided on the first device, for example, enabling a keyboard share or disabling the keyboard share. Taking the enabling the keyboard sharing function as an example, the method for controlling the input function in this example is described. After the keyboard sharing function is enabled or turned on, the first device performs the BLE broadcast to inform the second device. When the first device receives a connection request from the second device and establishes a connection with the second device, the first device performs an interception operation, so as to intercept the input events sent by the keyboard in Android Input Subsystem (i.e., Android framework Input), and forwards the intercepted input events to the second device connected with the first device.

In the examples of the present disclosure, when the input device comprises multiple input devices, the first device is connected with the multiple input devices. All input devices connected with the first device can be obtained, and an input device list is generated. The input device list includes device information of the input devices, and the device information includes a vendor identity identifier (Vendor ID), a product identity identifier (Product ID), an input device identifier (Input Device ID), and an input device name (Name). After detecting that the input device sharing function is enabled, the input device list is displayed to the user. In order to the simplicity of the display interface, only the input device name is displayed in the input device list to display to the user. Furthermore, an association relationship between the input device name and the Vendor Id, the Product Id as well as the Input Device Id is established in advance. One or more input devices to be shared for sharing to the second device an input function to be shared is selected and determined by the user in the input device list. For example, the user selects the keyboard connected to the first device as the input device to be shared, and the input function of the keyboard is treated as the input function to be shared. The device information of one or more input devices to be shared is saved, and a listening interface of each of the one or more input devices to be shared is registered in an Input subsystem of the first device. The input event sent by each of input devices to be shared is monitored through the respective listening interface. If the input event is monitored through the listening interface, and based on the saved device information, it is determined that the device to be shared of the input event is an input device to be shared among one or more input devices to be shared, then it is determined that the input event sent by the input device is monitored. The Vendor Id, Product Id, and Input Device Id of the input device to be shared are recorded into the Input subsystem, and recorded in a list of input devices to be shared. When the input device to be shared sends an input event, the interception will be triggered. That is, when the Input subsystem receives the input event and the input device that reports this input event belongs to the list of input devices to be shared, the input event is forwarded to the listening interface. The listening interface encapsulates the input data sent by the input event according to device descriptor information of the second device, and then forwards it to the second device connected with the first device.

In the examples, an input device sharing function control, such as a virtual switch, is provided on a user interaction interface of the first device. Alternatively, a key on the first device may also be set as an input device sharing function control. For example, when the user interaction interface of the first device is a designated interface, a volume control key can be set as the input device sharing function control. Whether the input device sharing function is enabled is determined by detecting the state of the input device sharing function control in the first device. If it is detected that the input device sharing function control is enabled, it is determined that the enabled input device sharing function is detected. In response to detecting that no input device sharing function control is enabled, it is determined that the enabled input device sharing function is not detected and the detection continues. A message receiving function or a voice monitoring function of the first device may also be called, and whether the input device sharing function is enabled is determined by detecting whether a control instruction for enabling or turning on the input device sharing function is received. The control instruction may be sent by another device associated with the first device, for example, other device associated with the first device sends the control instruction for enabling the input device sharing function to the first device. The control instruction may also be a voice control command issued by the user, for example, "Xiao Ai, turn on the input device sharing function" issued by the user is detected.

In the examples of the present disclosure, if it is detected that the state of the input device sharing function control is switched from being turned on to being turned off, or a control instruction for turning off the input device sharing function is received, the previously saved information of the input device to be shared is cleared in the Input interface, and input events sent by the input device is only retained on the first device connected to the input device, that is, returning to keep the input events sent by the input device on the first device.

In the examples, in response to detecting that the first device is disconnected from the input device, and monitoring that the input device establishes a connection with the first device, it is determined that the input device of which a connection relationship is re-established is the input device to be shared.

In some examples, the keyboard of the input device is used as the input device to be shared, and the keyboard may disconnected from the first device due to other reasons (poor contact or unstable connection signal). After the keyboard re-establishes a connection with the first device, the keyboard will be determined as the input device to be shared again, since the keyboard has been saved in the first device as the input device to be shared, that is, saved in the list of input device to be shared of the Input subsystem, and the input event triggered by the keyboard will be shared to a second device connected to the first device via the Input subsystem and the listening interface.

Figure 3:
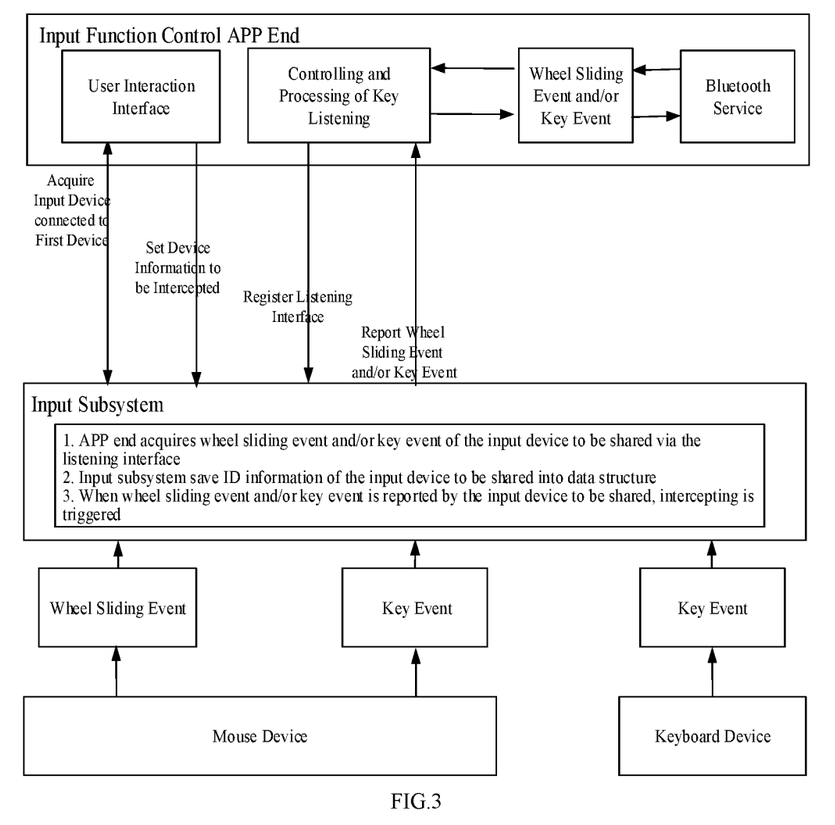
FIG. 3 is a schematic diagram illustrating an interaction between an input device and a first device according to some examples of the present disclosure.

FIG. 3 is a schematic diagram illustrating interaction between an input device and a first device according to some examples. As shown in FIG. 3, the method for controlling the input function provided by the examples of the present disclosure is encapsulated as an input function control application (APP) and installed on the first device. For a wheel sliding event and a key event reported by the mouse device of the input device as well as a key event reported by the keyboard device of the input device received by Input subsystem in the first device, the Input subsystem performs the interception and interaction with the input function control APP, and forwards the input events to the second device through the Bluetooth service. The process of intercepting and interacting between the Input subsystem and the input function control APP includes: the input function control APP obtains one or more input devices connected to the first device, and displays them in the user interaction interface; after the user determines the input device to be shared, the input function control APP sends the ID information of the input device to be shared to the Input subsystem, and registers the listening interface in the Input subsystem. The Input subsystem saves the ID information of the input device to be shared in the data structure, and determines the intercepted input device according to the information of the input device to be shared. In response to detecting the wheel sliding event and/or the key event reported by the intercepted input device, forwarding the wheel sliding event and/or the key event to the listening interface, and the listening interface reports the intercepted wheel sliding event and/or the key event to the input function control APP, and the input function control APP forwards the wheel sliding event and/or the key event to the second device through the Bluetooth service.

Figure 4:
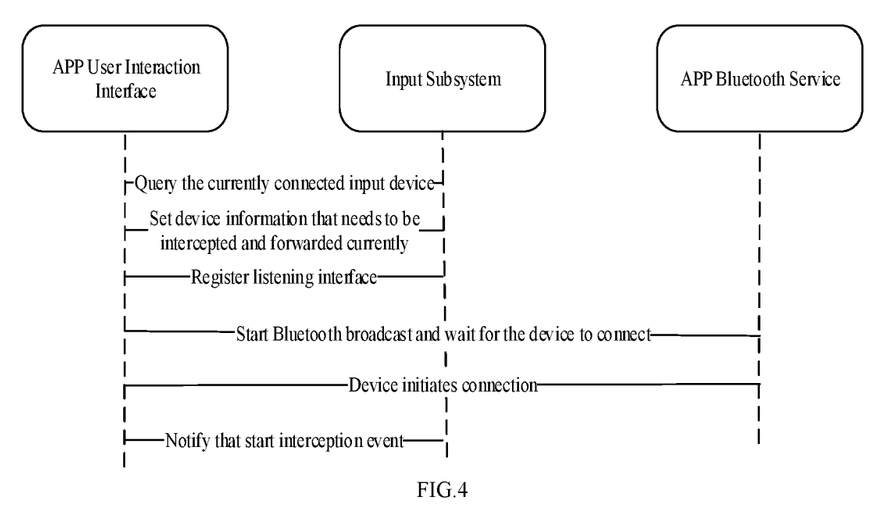
FIG. 4 is a schematic diagram illustrating an interaction inside of a first device according to some examples of the present disclosure.

FIG. 4 is a schematic diagram illustrating an interaction inside of a first device according to some examples. As shown in FIG. 4, the interaction process between the user interaction interface of the input function control APP, the Input subsystem and the APP Bluetooth service includes: the input function control APP determines the input devices currently connected with the first device by querying the Input subsystem, and the input devices currently connected with the first device are displayed on the user interaction interface, one or more input device to be shared is determined according to the user's selection, and the one or more input device to be shared is regarded as a device that needs to be intercepted and forwarded currently. The input function control APP sets the device information that needs to be intercepted and forwarded currently and sends it to the Input subsystem, and registers the listening interface in the Input subsystem. The input function control APP calls the Bluetooth service, starts the Bluetooth broadcast and wait for the second device to connect. If a connection to the first device initiated by the second device is received, then after the first device and the second device establish the connection, the Input subsystem starts to intercept input events via the Input subsystem. In this example, the input event sent by the input device connected with the first device is shared to the second device, which avoids the inconvenience caused by the user switching between multiple devices when multiple devices share the same input device. Before starting the Bluetooth broadcast, device descriptor information of the first device needs to be initialized according to the information of the input device to be shared, that is, node information is declared in the human-machine interface Device (HID) descriptor of the first device, so as to support sharing of multiple input devices to be shared. For example, the user selects the mouse and the keyboard as input devices to be shared at the same time, and the information of both of the mouse and the keyboard need to be declared in the HID descriptor of the first device.

In the example of the present disclosure, the input event may be a key event, and the key value corresponding to the key event is forwarded to the listening interface. The key event may include a key event triggered by the mouse and a key event triggered by the keyboard. For example, the key event triggered by the mouse includes selecting a certain application program in the second device, and the key event triggered by the keyboard includes a key value corresponding to the key in the keyboard. When the input device sharing function is not enabled or not turned on, the Input subsystem will obtain the key value through a reader, and distribute the key value to a current window corresponding to the first device through a dispatcher. If it is detected that the input device sharing function is enabled and the input device to be shared is detected, then the key value is forwarded to the listening interface according to the ID information of the input device to be shared recorded in the Input subsystem.

The input event can also be a wheel event of a mouse. In order not to affect the use of the user, a display icon of a mouse pointer or a mouse arrow is shielded on the display interface of the first device, and a coordinate position of the mouse pointer is set, and a relative position change data of the mouse pointer is forwarded to the listening interface.

The input event may also be a touchpad event, and the input data corresponding to the touchpad event is forwarded to the listening interface.

In the example of the present disclosure, in order to facilitate the user to switch between the first device and the second device, the method for controlling the input function further includes: if it is detected that a switching function is triggered, switching and inputting the input event of the input device to the first device or the second device. The user can flexibly switch the input event triggered by the input device between the first device and the second device by controlling the switching function. A switching function option is set on the display interface of the first device or the second device, and the switching function is achieved by the switching function option. After triggering the switching function option, function options of the switching control is displayed on the display interface of the corresponding device for the user to select. The switching function can also be implemented by a key or a key combination. For example, when the second device is one device, it is preset that if the switching instruction of the keys Ctrl+@ is monitored, the input event of the input device is switched from the current device to another device. That is, switching from the first device to the second device, or switching from the second device to the first device. When the second devices includes multiple devices, for the convenience of description, two second devices are taken as an example, one of the second devices is represented by the second device A, and the other second device is represented by the second device B. It is preset that the switching instruction of keys Ctrl+Alt+A denotes switching the input event of the input device from the current device to the second device A. Alternatively, it is preset that if the switching instruction of keys Ctrl+Alt+B denotes switching the input event of the input device from the current device to the second device B. The combination of keys may be performed according to the user's preference during the specific setting, and the combination mode of the keys is not limited in this example.

In order to facilitate the user's operation, the switching function is set to support the switching of the input device between the first device and the second device. If the switching function is triggered, the object serviced by the input device is switched.

In the example of the present disclosure, monitoring that the switching function is triggered includes: in response to that a function option of the switching control on the display interface of the first device or the second device is triggered, determining that the triggered switching function is monitored. Monitoring that the switching function is triggered further includes: if it is monitored that the key and/or the key combination on the input device is triggered, determining that the triggered and displayed switching function is monitored. Through the switching function, multiple devices and a set of keyboard and mouse can work together.

In some examples, a connection is established between the first device and the input device through a connection wire, and a connection is established between the first device and the second device through BLE. When it is detected on the first device that the input device sharing function is enabled, and it is monitored that the input device sends an input event, then by intercepting the input event and forwarding the input event to the second device, the input device connected to the first device is capable to share with the second device through BLE, and the Bluetooth function of the first device is fully utilized. Furthermore, the collaborative work between the first device and the second device is realized, such as the collaborative work between other electronic devices supporting Bluetooth such as mobile phones, tablets, notebooks, TVs, etc. In addition, in some examples, the related functions implemented through the general low-power Bluetooth application specification (hid over gatt profile, HOGP) can share and use input devices across platforms, such as Windows, Input Output System (IOS).

Based on the same concept, the examples of the present disclosure also provide an apparatus for controlling an input function.

It can be understood that, in order to realize the above-mentioned functions, the apparatus for controlling an input function provided by the examples of the present disclosure includes corresponding hardware structures and/or software modules for executing each function. Combining with the units and algorithm steps of each example disclosed in the examples of the present disclosure, the examples of the present disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the examples of the present disclosure.

Figure 5:
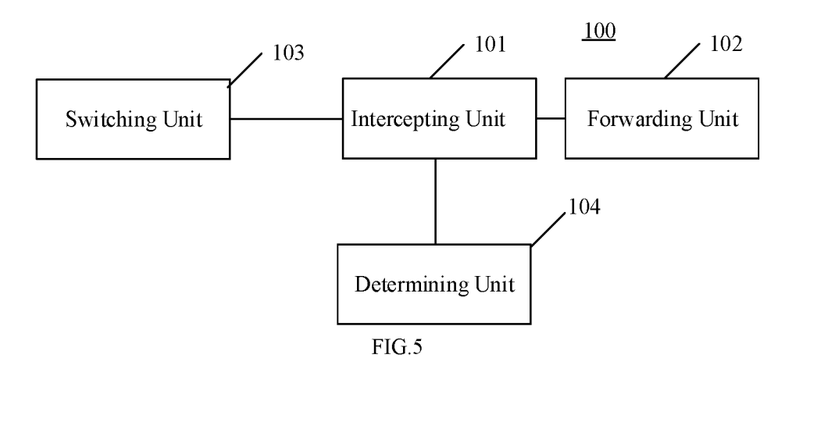
FIG. 5 is a block diagram of an apparatus for controlling an input function according to some examples of the present disclosure.

FIG. 5 is a block diagram of an apparatus for controlling an input function according to some examples. The apparatus for controlling the input function 100 is applied to a first device, the first device is connected to the input device, and the apparatus for controlling the input function 100 includes an intercepting unit 101 and a forwarding unit 102.

The intercepting unit 101 is configured, in response to detecting that an input device sharing function is enabled and an input event sent by the input device is monitored, intercept the input event; the forwarding unit 102 is configured to forward the intercepted input event to a second device connected with the first device.

In some examples, the interception unit 101 is configured to: in response to that the input device comprises a plurality of input devices, and after detecting that the input device sharing function is enabled, determine one or more input devices to be shared for sharing to the second device an input function to be shared, save respective device information of the one or more input devices to be shared, and register a listening interface in an input subsystem of the first device; and if the input event is listened through the listening interface and determining, based on the saved device information, the device to be shared that sends the input event is one of the one or more input devices to be shared, then determine that the input event sent by the input device is monitored.

In some examples, the interception unit 101 is configured to: in response to that the input event comprises a key event, forward a key value corresponding to the key event to the listening interface; and/or in response to that the input event comprises a wheel event of a mouse, shield a display icon of a mouse pointer on a display interface of the first device, set a coordinate position of the mouse pointer, and forward a relative position change data of the mouse pointer to the listening interface.

In some examples, the forwarding unit 102 is configured to, based on device descriptor information of the second device, encapsulate the input data sent by the input event and then forward the encapsulated input data to the second device connected with the first device.

In some examples, the input function control device further includes a switching unit 103, which is configured to switch the input event of the input device to the first device or the second device in response to monitoring that the switching function is triggered.

In some example, the switching unit 103 is configured to: in response to that a function option of a switching control on a display interface of the first device or the second device is triggered, determine that the switching function is monitored to be triggered; or in response to monitoring that a key and/or a key combination on the input device is triggered, determine that the switching function is monitored to be triggered and displayed.

In some examples, the interception unit 101 is configured to detect that an input device sharing function control is enabled; and/or receive a control instruction used to enable the input device sharing function.

In some examples, the apparatus for controlling the input function further includes a determining unit 104, which is configured to in response to detecting that the first device is disconnected from the input device and monitoring that the input device establishes a connection with the first device again, determine the input device for which a connection relationship is re-established as the input device to be shared.

Regarding the apparatus in the above-mentioned example, the specific manner in which each module performs the operation has been described in detail in the example of the method, and will not be described in detail here.

Figure 6:
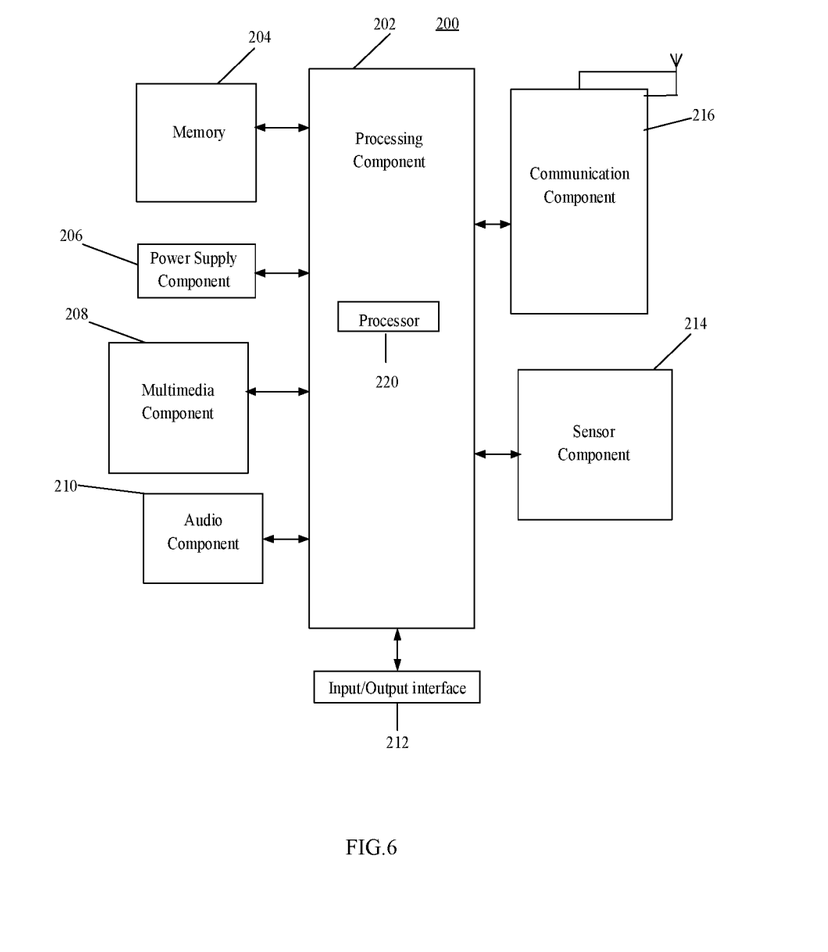
FIG. 6 is a block diagram of a device for controlling an input function according to some examples of the present disclosure.

FIG. 6 is a block diagram of a device for controlling an input function according to an example. For example, the device 200 may be a mobile phone, a computer, a digital broadcast terminal, a messaging device, a game console, a tablet device, a medical device, a fitness device, a personal digital assistant, and the like.

Referring to FIG. 6, the device 200 may include one or more of the following components: a processing component 202, a memory 204, a power supply component 206, a multimedia component 208, an audio component 210, an input/output (I/O) interface 212, a sensor component 214, and a communication component 216.

The processing component 202 generally controls the overall operations of the device 200, such as operations associated with displaying, telephone calls, data communication, camera operations, and recording operations. The processing component 202 may include one or more processors 220 to execute instructions to complete all or part of the steps in the above method. In addition, the processing component 202 may include one or more modules to facilitate interaction between the processing component 202 and other components. For example, the processing component 202 may include a multimedia module to facilitate interaction between the multimedia component 208 and the processing component 202.

The memory 204 is configured to store various types of data to support operations at the device 200. Examples of these data include instructions for any application or method operating on the device 200, contact data, phone book data, messages, pictures, videos, and so on. The memory 204 may be implemented by any type of volatile or non-volatile storage device or a combination of the any type of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 206 provides power to various components of the device 200. The power supply component 206 may include a power supply management system, one or more power supplies, and other components associated with generating, managing, and distributing power for the device 200.

The multimedia component 208 includes a screen that provides an output interface between the device 200 and the user. In some examples, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense a boundary of the touching operation or swiping operation, but also detect a duration and pressure related to the touching operation or swiping operation. In some examples, the multimedia component 208 includes a front camera and/or a rear camera. When the device 200 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 210 is configured to output and/or input audio signals. For example, the audio component 210 includes a microphone (MIC). When the device 200 is in an operation mode, such as a call mode, a recording mode, and a voice recognition mode, the microphone is configured to receive an external audio signal. The received audio signal may be further stored in the memory 204 or transmitted via the communication component 216. In some examples, the audio component 210 further includes a speaker for outputting audio signals.

The I/O interface 212 provides an interface between the processing component 202 and a peripheral interface module. The peripheral interface module may be a keyboard, a click wheel, a button and so on. These buttons may include, but are not limited to: home button, volume button, start button, and lock button.

The sensor assembly 214 includes one or more sensors for providing the status assessment of various aspects for the device 200. For example, the sensor component 214 can detect the on/off state of the device 200, and the relative positioning of the components, for example, the component is a display and a keypad of the device 200, and the sensor component 214 can also detect the position change of the device 200 or a component of the device 200, the presence or absence of user contact with the device 200, the orientation or acceleration/deceleration of the device 200, and the temperature change of the device 200. The sensor assembly 214 may include a proximity sensor configured to detect the presence of nearby objects without any physical contact. The sensor assembly 214 may also include a light sensor, such as a CMOS or CCD image sensor, for use in imaging applications. In some examples, the sensor assembly 214 may also include an acceleration sensor, a gyro sensor, a magnetic sensor, a pressure sensor, or a temperature sensor.

The communication component 216 is configured to facilitate wired or wireless communication between the device 200 and other devices. The device 200 can access a wireless network based on a communication standard, such as WiFi, 2G, or 3G, or a combination of the communication standard. In an example, the communication component 216 receives a broadcast signal or broadcast related information from an external broadcast management system via a broadcast channel. In an example, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 200 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the interface display method described in any of the above examples.

In an example, there is also provided a non-transitory computer-readable storage medium including instructions, such as a memory 204 including instructions, which can be executed by the processor 220 of the device 200 to complete the above method. For example, the non-transitory computer-readable storage medium may be ROM, random access memory (RAM), CD-ROM, magnetic tape, floppy disk, optical data storage device, or the like.

According to some examples of the present disclosure, a method for controlling an input function, applied to a first device connected with an input device comprises in response to detecting that an input device sharing function is enabled and an input event sent by the input device is monitored, intercepting the input event; and forwarding the intercepted input event to a second device connected with the first device.

In some examples, the input device comprises a plurality of input devices, and the method further comprises: determining one or more input devices to be shared for sharing to the second device an input function to be shared, saving respective device information of the one or more input devices to be shared, and registering a listening interface in an input subsystem of the first device; wherein the input event sent by the input device is monitored comprises: if the input event is listened through the listening interface and determining, based on the saved device information, the device to be shared that sends the input event is one of the one or more input devices to be shared, determining that the input event sent by the input device is monitored.

In some examples, the intercepting the input event comprises: in response to that the input event comprises a key event, forwarding a key value corresponding to the key event to the listening interface.

In some examples, the intercepting the input event comprises: in response to that the input event comprises a wheel event of a mouse, shielding a display icon of a mouse pointer on a display interface of the first device, setting a coordinate position of the mouse pointer, and forwarding a relative position change data of the mouse pointer to the listening interface.

In some examples, the forwarding the intercepted input event to the second device connected with the first device comprises: based on device descriptor information of the second device, encapsulating the input data sent by the input event and forwarding the encapsulated input data to the second device connected with the first device.

In some examples, the method further comprising: in response to monitoring that a switching function is triggered, switching and inputting the input event of the input device to the first device or the second device.

In some examples, the monitoring that the switching function is triggered comprises: in response to that a function option of a switching control on a display interface of the first device or the second device is triggered, determining that the switching function is monitored to be triggered.

In some examples, the monitoring that the switching function is triggered comprises: in response to monitoring that a key and/or a key combination on the input device is triggered, determining that the switching function is monitored to be triggered and displayed.

In some examples, the detecting that the input device sharing function is enabled comprises: detecting that an input device sharing function control is enabled; and/or receiving a control instruction used to enable the input device sharing function.

In some examples, the method further comprising: in response to detecting that the first device is disconnected from the input device and monitoring that the input device establishes a connection with the first device again, determining the input device for which a connection relationship is re-established as the input device to be shared.

According to some examples of the present disclosure, a device for controlling an input function comprises: a processor; memory for storing instructions executable by the processor; wherein, the processor is configured to: in response to detecting that an input device sharing function is enabled and an input event sent by the input device is monitored, intercept the input event; and forward the intercepted input event to a second device connected with the first device.

In some examples, the input device comprises a plurality of input devices, and the processor is further configured to: determine one or more input devices to be shared for sharing to the second device an input function to be shared, save respective device information of the one or more input devices to be shared, and register a listening interface in an input subsystem of the first device; and if the input event is listened through the listening interface and determining, based on the saved device information, the device to be shared that sends the input event is one of the one or more input devices to be shared, then determine that the input event sent by the input device is monitored.

In some examples, the processor is configured to: in response to that the input event comprises a key event, forward a key value corresponding to the key event to the listening interface.

In some examples, the processor is configured to: in response to that the input event comprises a wheel event of a mouse, shield a display icon of a mouse pointer on a display interface of the first device, set a coordinate position of the mouse pointer, and forward a relative position change data of the mouse pointer to the listening interface.

In some examples, the processor is configured to: based on device descriptor information of the second device, encapsulate the input data sent by the input event and forward the encapsulated input data to the second device connected with the first device.

In some examples, the processor is further configured to: in response to monitoring that a switching function is triggered, switch and input the input event of the input device to the first device or the second device.

In some examples, the processor is configured to: in response to that a function option of a switching control on a display interface of the first device or the second device is triggered, determine that the switching function is monitored to be triggered.

In some examples, the processor is configured to: in response to monitoring that a key and/or a key combination used to control the switching control on the input device is triggered, determine that the switching function is monitored to be triggered and displayed.

In some examples, the processor is configured to: detect that an input device sharing function control is enabled; and/or receive a control instruction used to enable the input device sharing function.

According to some examples of the present disclosure, a non-transitory computer-readable storage medium, when instructions in the storage medium are executed by a processor of a mobile terminal, the mobile terminal is enabled to implement a method for controlling an input function, the method for controlling the input function being applied to a first device connected with an input device and comprising: in response to detecting that an input device sharing function is enabled and an input event sent by the input device is monitored, intercepting the input event; and forwarding the intercepted input event to a second device connected with the first device.

It should be understood that in the present disclosure, "plurality" or "multiple" refers to two or more than two, and other quantifiers are similar. "And/or", which describes the association relationship of the associated objects, means that there can be three kinds of relationships, for example, A and/or B, which can mean that A exists alone, A and B exist at the same time, and B exists alone. The character "/" generally indicates that the associated objects are an "or" relationship. The singular forms "a", "the", and "said" are intended to include the plural forms as well, unless the context clearly dictates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, the first information may also be referred to as the second information, and similarly, the second information may also be referred to as the first information, without departing from the scope of the present disclosure.

It should be further understood that, unless otherwise specified, a "connection" includes a direct connection between the two without other components, and also includes an indirect connection between the two with other elements.

It is further to be understood that although the operations in the examples of the present disclosure are described in a specific order in the drawings, it should not be construed as requiring that the operations be performed in the specific order shown or the serial order, or requiring perform all operations shown to obtain the desired result. In certain circumstances, multitasking and parallel processing may be advantageous.

Other examples of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the scope of the appended claims.

What is claimed is:

1. A method for controlling an input function, performed by a first device connected to an input device, and comprising: in response to detecting that an input device sharing function is disabled and an input event sent by the input device is monitored, obtaining the input event to operate the first device, and displaying the input event in the first device; in response to detecting that the input device sharing function is enabled and the input event sent by the input device is monitored, intercepting the input event; and forwarding the intercepted input event to a second device connected with the first device, so as to display the input event sent by the input device in the second device without manual switch of the connection between the input device and the first device as well as the second device, wherein the input event is not displayed in the first device, the second device is not directedly connected to the input device, and the first device is one of multiple terminal devices, and the second device is another one of the multiple terminal devices; wherein the input device comprises a plurality of input devices, and the method further comprises: generating an input device list; displaying the input device list to a user in response to detecting that the input device sharing function is enabled; determining an input device to be shared according to selection of the user in the input device list, wherein the input device to be shared is used to control the second device; further comprising: in response to monitoring that a switching function is triggered, switching and inputting the input event of the input device to the first device or the second device; and wherein monitoring that the switching function is triggered comprises: in response to that a function option of a switching control on a display interface of the first device or the second device is triggered, determining that the switching function is monitored to be triggered.

2. The method according to claim 1, wherein determining the input device to be shared according to selection of the user in the input device list comprises:
   determining one or more input devices to be shared for sharing to the second device an input function to be shared, saving respective device information of the one or more input devices to be shared, and registering a listening interface in an input subsystem of the first device;
   wherein that the input event sent by the input device is monitored comprises:
   in response to determining that the input event is listened through the listening interface and determining, based on the saved device information, the device to be shared that sends the input event is one of the one or more input devices to be shared, determining that the input event sent by the input device is monitored.

3. The method according to claim 2, wherein the intercepting the input event comprises:
   in response to determining that the input event comprises a key event, forwarding a key value corresponding to the key event to the listening interface.

4. The method according to claim 2, wherein intercepting the input event comprises:
   in response to determining that the input event comprises a wheel event of a mouse, shielding a display icon of a mouse pointer on a display interface of the first device, setting a coordinate position of the mouse pointer, and forwarding a relative position change data of the mouse pointer to the listening interface.

5. The method according to claim 1, wherein forwarding the intercepted input event to the second device connected with the first device comprises:
   based on device descriptor information of the second device, encapsulating the input data sent by the input event and forwarding the encapsulated input data to the second device connected with the first device.

6. The method according to claim 1, wherein monitoring that the switching function is triggered comprises: in response to monitoring that a key or a key combination on the input device is triggered, determining that the switching function is monitored to be triggered and displayed.

7. The method according to claim 1, wherein detecting that the input device sharing function is enabled comprises:
   detecting that an input device sharing function control is enabled; or receiving a control instruction used to enable the input device sharing function.

8. The method according to claim 2, further comprising:
in response to detecting that the first device is disconnected from the input device and monitoring that the input device establishes a connection with the first device again, determining the input device for which a connection relationship is re-established as the input device to be shared.

9. A device for controlling an input function, comprising: a processor; memory for storing instructions executable by the processor; wherein, the processor is configured to: in response to detecting that an input device sharing function is disabled and an input event sent by an input device is monitored, obtain the input event to operate the first device connected to the input device, and display the input event in the first device; in response to detecting that the input device sharing function is enabled and the input event sent by the input device is monitored, intercept the input event; and forward the intercepted input event to a second device connected with the first device; so as to display the input event sent by the input device in the second device without manual switch of the connection between the input device and the first device as well as the second device, wherein the input event is not displayed in the first device, the second device is not directedly connected to the input device, and the first device is one of multiple terminal devices, and the second device is another one of the multiple terminal devices; wherein the input device comprises a plurality of input devices, and the processor is further configured to: generate an input device list; display the input device list to a user in response to detecting that the input device sharing function is enabled; determine an input device to be shared according to selection of the user in the input device list, wherein the input device to be shared is used to control the second device; wherein the processor is further configured to: in response to monitoring that a switching function is triggered, switch and input the input event of the input device to the first device or the second device; and wherein the processor is configured to: in response to that a function option of a switching control on a display interface of the first device or the second device is triggered, determine that the switching function is monitored to be triggered.

10. The device according to claim 9, wherein the processor is further configured to:
determine one or more input devices to be shared for sharing to the second device an input function to be shared, save respective device information of the one or more input devices to be shared, and register a listening interface in an input subsystem of the first device;
in response to determining that the input event is listened through the listening interface and determining, based on the saved device information, the device to be shared that sends the input event is one of the one or more input devices to be shared, then determine that the input event sent by the input device is monitored.

11. The device according to claim 10, wherein the processor is configured to:
in response to determining that the input event comprises a key event, forward a key value corresponding to the key event to the listening interface.

12. The device according to claim 10, wherein the processor is configured to:
in response to determining that the input event comprises a wheel event of a mouse, shield a display icon of a mouse pointer on a display interface of the first device, set a coordinate position of the mouse pointer, and forward a relative position change data of the mouse pointer to the listening interface.

13. The device according to claim 9, wherein the processor is configured to:
based on device descriptor information of the second device, encapsulate the input data sent by the input event and forward the encapsulated input data to the second device connected with the first device.

14. The device according to claim 9, wherein the processor is configured to: in response to monitoring that a key or a key combination used to control the switching control on the input device is triggered, determine that the switching function is monitored to be triggered and displayed.

15. The device according to claim 9, wherein the processor is configured to:
detect that an input device sharing function control is enabled; or receive a control instruction used to enable the input device sharing function.

16. A non-transitory computer-readable storage medium, when instructions in the storage medium are executed by a processor of a mobile terminal, the mobile terminal is enabled to implement a method for controlling an input function, the method for controlling the input function being performed by a first device connected to an input device and comprising: in response to detecting that an input device sharing function is disabled and an input event sent by the input device is monitored, obtaining the input event to operate the first device, and displaying the input event in the first device; in response to detecting that the input device sharing function is enabled and an the input event sent by the input device is monitored, intercepting the input event; and forwarding the intercepted input event to a second device connected with the first device, so as to display the input event sent by the input device in the second device without manual switch of the connection between the input device and the first device as well as the second device, wherein the input event is not displayed in the first device, the second device is not directedly connected to the input device, and the first device is one of multiple terminal devices, and the second device is another one of the multiple terminal devices; wherein the input device comprises a plurality of input devices, and the method further comprises: generating an input device list; displaying the input device list to a user in response to detecting that the input device sharing function is enabled; and determining an input device to be shared according to selection of the user in the input device list, wherein the input device to be shared is used to control the second device; further comprising: in response to monitoring that a switching function is triggered, switching and inputting the input event of the input device to the first device or the second device; and wherein monitoring that the switching function is triggered comprises: in response to that a function option of a switching control on a display interface of the first device or the second device is triggered, determining that the switching function is monitored to be triggered.

* * * * *